(12) United States Patent
Malladi et al.

(10) Patent No.: US 10,157,058 B2
(45) Date of Patent: Dec. 18, 2018

(54) ADAPTIVE SELF-CONFIGURING SENSOR NODE

(71) Applicant: Analog Devices Global, Hamilton (BM)

(72) Inventors: Shankar S. Malladi, Walpole, MA (US); Nagarjuna Gandrothu, Bangalore (IN); Subbarao Chennu, Bangalore (IN)

(73) Assignee: Analog Devices Global, Hamilton (BM)

( * ) Notice: Subject to any disclaimer, the term of this patent is extended or adjusted under 35 U.S.C. 154(b) by 0 days.

(21) Appl. No.: 15/273,940

(22) Filed: Sep. 23, 2016

(65) Prior Publication Data
US 2018/0088859 A1 Mar. 29, 2018

(51) Int. Cl.
*G06F 9/00* (2006.01)
*G06F 3/06* (2006.01)

(52) U.S. Cl.
CPC .............. *G06F 9/00* (2013.01); *G06F 3/0604* (2013.01); *G06F 3/0655* (2013.01); *G06F 3/0679* (2013.01)

(58) Field of Classification Search
CPC ..... G06F 3/0655; G06F 3/0679; G06F 3/0604
See application file for complete search history.

(56) References Cited

U.S. PATENT DOCUMENTS

| | | | |
|---|---|---|---|
| 7,062,705 B1 | 6/2006 | Kirkwood et al. | |
| 7,304,976 B2 | 12/2007 | Mao et al. | |
| 9,626,238 B2 * | 4/2017 | Sheynblat | G06F 9/542 |
| 2005/0144343 A1 * | 6/2005 | Hamdan | H04L 69/329 |
| | | | 710/57 |
| 2006/0015294 A1 | 1/2006 | Yetter, Jr. et al. | |
| 2006/0187017 A1 | 8/2006 | Kulesz et al. | |
| 2007/0210916 A1 | 9/2007 | Ogushi et al. | |
| 2012/0166789 A1 * | 6/2012 | Baxi | G06F 13/385 |
| | | | 713/100 |

* cited by examiner

*Primary Examiner* — Ajay Ojha
(74) *Attorney, Agent, or Firm* — Schwegman Lundberg & Woessner, P.A.

(57) ABSTRACT

An adaptive self-configuring sensor node is disclosed herein. The node is associated with one or more sensor, and can include a microcontroller unit (MCU), sensors and a wired/wireless communication module (e.g., transceiver) to communicate the data collected by the sensors. Sensor node software running on the CPU can be adaptively reconfigured based on the sensors connected with the node, and using configuration data that is read from a non-volatile memory (NVM). The NVM can further store loadable sensor device specific data acquisition and processing (DAP) routines corresponding to one or more of the sensors, which can be executed to configure a sensor or cause collection or processing of sensor data.

26 Claims, 6 Drawing Sheets

ADAPTIVE SELF-CONFIGURING SENSOR NODE

BACKGROUND

For a sensor node product with one or more sensors, the firmware running on the node can be used to configure the sensors and process the data collected by the sensors. However, for any given sensor node product, the firmware is static and specific to the sensors associated with the node. Accordingly, changing a sensor generally involves revision of the firmware, inhibiting or even precluding sensor node reconfiguration.

SUMMARY OF THE DISCLOSURE

Embodiments of the present disclosure can provide an adaptive self-configuring sensor node. In an example, an embedded sensor system can include a memory circuit storing configuration data and loadable sensor device data acquisition and processing routines corresponding to respective ones of a plurality of sensing devices. The embedded sensor system can include a processor circuit communicatively coupled to the memory circuit and coupleable to one or more sensing devices amongst the plurality of sensing devices. The processor circuit can be configured to detect that the one or more sensing devices amongst the plurality of sensing devices is coupled to the processor circuit and is enabled to collect sensed data, using information about a sensor control field stored in the memory circuit. The sensor control field can define at least a presence or absence of a sensing device. Configuration data can be retrieved from the memory circuit. The retrieved configuration data can correspond to the enabled one or more sensing devices amongst the plurality of sensing devices. The enabled one or more sensing devices can be configured based on the retrieved configuration data. Sensed data can be received from the configured one or more sensing devices at least in part by executing a corresponding one of the loadable sensor data acquisition and processing routines. In an example, sensed data may be acquired from the one or more sensing devices after their configuration and without executing a data acquisition and processing routine.

In an example, a method for configuring an embedded sensor system with a sensing device can include accessing a control page stored in a memory circuit. The control page can include a sensor control field defining a presence or absence of the sensing device, and an address field defining a memory location storing configuration data for the sensing device. The method can further include detecting that the sensing device is enabled to collect sensed data based on the sensor control field. The configuration data for the sensing device can be retrieved from the memory location. The retrieved configuration data can include a loadable sensor device data acquisition and processing routine for collecting the sensed data. The enabled sensing device can be configured based on the retrieved configuration data. Sensed data can be received from the configured sensing device at least in part by executing the loadable sensor data acquisition and processing routine.

In another example, at least one computer-readable storage medium can be provided to include instructions that, when executed on a central processing unit (CPU) of an embedded sensor system, cause the CPU to access a control page stored in a memory circuit. The control page can include a sensor control field defining a presence or absence of a sensing device, and an address field defining a memory location storing configuration data for the sensing device. The instructions can further cause the CPU to detect that the sensing device is enabled to collect sensed data based on the sensor control field. The instructions can further cause the CPU to retrieve the configuration data for the sensing device from the memory location. The retrieved configuration data can include a loadable sensor device data acquisition and processing routine for collecting the sensed data. The instructions can further cause the CPU to configure the enabled sensing device based on the retrieved configuration data. The instructions can further cause the CPU to receive sensed data from the configured sensing device at least in part by executing the loadable sensor data acquisition and processing routine.

This overview is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

In accordance with proposed techniques, an adaptive self-configuring sensor node associated with one or more sensors is provided. A sensor node can include a microcontroller unit (MCU, such as including a general purpose CPU or one or more application-specific processor circuits), sensors and a communication link (wired or wireless communication module) to communicate the sensor data collected by the sensors. Sensor node monitoring or control routines (e.g., software or firmware running on the CPU) that are sensor-dependent can be adaptively reconfigured based on the sensors connected with the node, and using configuration data that is read from a non-volatile memory. More specifically, for a given sensor node product, the software or firmware (e.g., associated with particular sensor configuration and sensor functions) can be modified to interface with the required sensors, using the appropriate sensor drivers. Sensor driver software can be written based on a sensor data sheet (e.g., an electronic data sheet, or EDS) with configuration information. Each time a new product is built with a given set of sensors, the corresponding software or firmware can be easily updated and a new binary image of the software or firmware can be loaded dynamically by the embedded device (e.g., as sensors are added or removed) using the configuration data stored in non-volatile memory.

Moreover, given the regulatory certification requirements for the communication module, it is highly desirable to separate the software or firmware that varies from product to product (e.g., when one or more of the sensors in the sensor node change) from the software or firmware running on the communication module (e.g., the communication stack). In this manner, the communication stack can remain static while the sensor detection, installation, monitoring or control routines can be varied. By using the proposed techniques for an adaptive self-configuring sensor node, reuse of the "once" certified module can be achieved for many or all product variants. For example, the sensor-dependent software/firmware can be adaptively reconfigured using configuration data stored in a non-volatile memory, and it can also run separately, on a different microcontroller from the microcontroller that runs the communication stack software.

Figure 1:
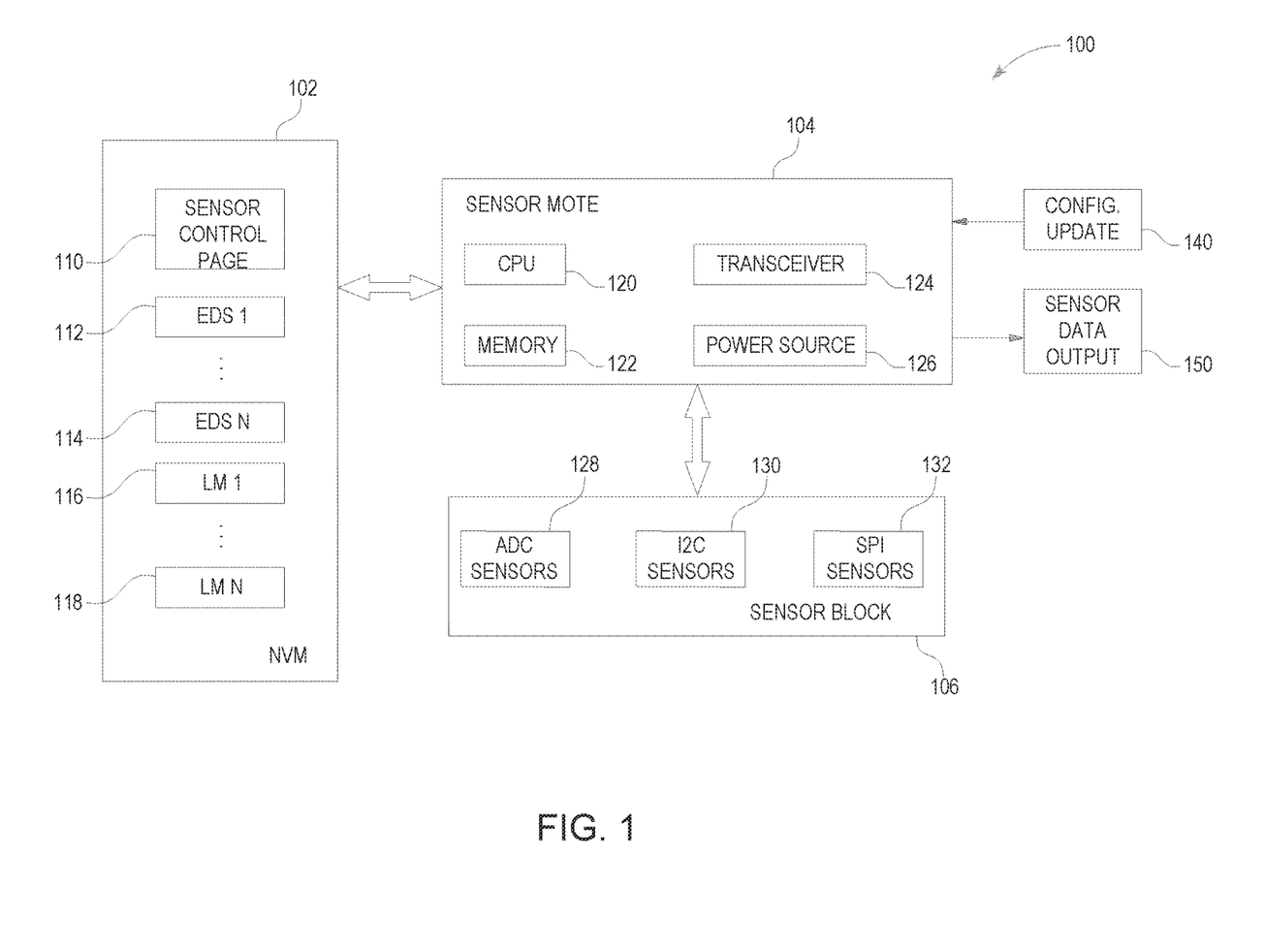
FIG. 1 depicts a sensor mote system using configuration data stored on non-volatile memory (NVM), in accordance with an example embodiment.

FIG. 1 depicts a sensor mote system using configuration data stored on non-volatile memory (NVM), in accordance with an example embodiment. As used herein, the term "sensor mote" refers to a sensor-based data collection system that includes a micro-controller unit (MCU) or a central processing unit (CPU), a transceiver (wired or wireless), memory, a power source, and one or more sensors. Referring to FIG. 1, the sensor mote system 100 includes a sensor mote 104, a non-volatile memory (NVM) 102 and a sensor block 106. The sensor mote 104 may include a CPU 120, memory 122, a transceiver 124, and a power source 126. The sensor mote 104 may further include a sensor block 106. The sensor block 106 may include one or more sensors coupled to a respective interface circuit, such as one or more Analog-to-Digital-Conversion (ADC)-equipped sensors 128, one or more Inter-Integrated Circuit (I2C)-equipped sensors 130, and one or more Serial Peripheral Interface (SPI)-equipped sensors 132. The sensors within the sensor block 106 can be configured by the CPU 120 to collect sensor data 150, which can be communicated to another device by the transceiver 124 (e.g., for storage or further processing).

In an example, sensor devices can include digital or analog devices. The I2C and SPI-based sensors may interface to the CPU by digital means. Certain sensors that sense pressure, gas, etc. in analog nature may use external ADC interfacing to the CPU. Additional example sensors may include a 3-axis MEMS accelerometer using an SPI interface, temperature/humidity sensors (SPI-based or I2C-based), pressure sensors (I2C-based), ambient light sensor (I2C based), and so forth.

Even though the NVM 102 the sensor mote 104 and the sensor block 106 are illustrated as separate blocks, the disclosure may not be limited in this regard and one or more of the modules 102, 104 and 106 may be integrated together in commonly-shared integrated circuit, a commonly-shared integrated module (e.g., a circuit package), a commonly-shared circuit board assembly, or within a commonly-shared housing. For example, the sensor mote 104 may be a single module, which can be part of a wireless sensor network (WSN) motherboard, together with the sensor block 106 and the NVM 102. Other configurations may also be used without restricting any of the functionalities disclosed herein.

The NVM 102 may be configured to store configuration data and loadable modules (LMs), such as LM 1 116 through LM N 118. The configuration data can include electronic data sheets (EDSs), such as EDS 1 112 through EDS N 114, which may be used by the CPU 120 to detect and configure one or more of the sensors 128, 130, 132 in the sensor block 106. An example EDS is further described in reference to FIG. 3.

The LMs, such as LM 1 116 through LM N 118 can include loadable sensor device data acquisition and processing routines, which can be used by the CPU 120 for data capture/measurement as well as data processing (e.g., data conversion to one or more formats suitable for presentation or storage). In an example, the LMs, such as LM 1 116 through LM N 118 can be built as position independent objects (e.g., using position independent code), which can be loaded and executed by the CPU 120 to collect data from one or more of the sensors within the sensor block 106. In some instances, the LMs, such as LM 1 116 through LM N 118 may be used to detect and configure the sensors, as well as to collect data from the sensors.

As illustrated in FIG. 1, the NVM 102 may store N number of electronic data sheets and N number of loadable modules, one for each of N possible sensors that may be used within the sensor block 106. Even though memory module 102 is illustrated as non-volatile memory, other types of permanent storage (e.g., hard drive, magnetic storage, optical storage, etc.) may also be used to store the sensor control page 110, the EDSs, such as EDS 1 112 through EDS N 114, and the LMs, such as LM 1 116 through LM N 118.

Figure 2:
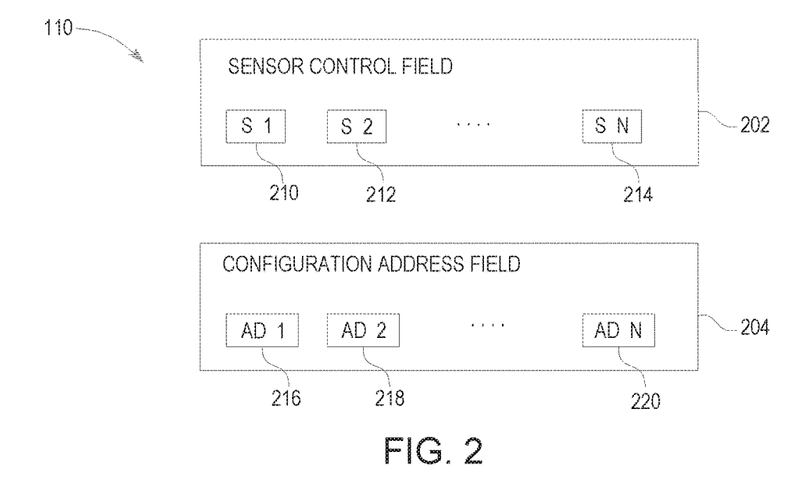
FIG. 2 depicts an example sensor control page for configuring a sensor node, in accordance with an example embodiment.

In an example, the configuration data within the NVM 102 may further include a sensor control page 110. FIG. 2 depicts an example sensor control page for configuring a sensor node, in accordance with an example embodiment. The sensor control page 110 may include a sensor control field 202 and a configuration address field 204. The sensor control field 202 may include N number of bits, S1, ..., Sn (210, ..., 214), which may be used to designate sensors within the sensor block 106 as enabled or disabled. For example, a bit value of 1 may be indicative of a sensor that is enabled, and a bit value of 0 may be indicative of a sensor that is disabled.

The configuration address field 204 may provide memory address information 216, 220 for the memory locations storing the corresponding electronic data sheets 112, ..., 114, respectively. In an example, the memory address locations 216, ..., 220 may each be two bytes, designating locations within the NVM 102.

Figure 3:
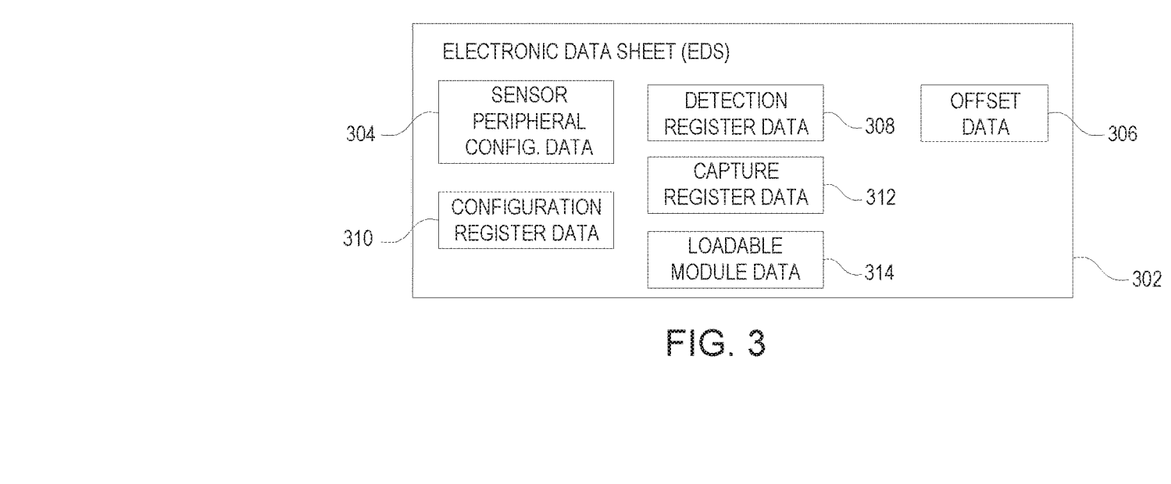
FIG. 3 depicts an example electronic data sheet (EDS) used for configuring a sensor node, in accordance with an example embodiment.

FIG. 3 depicts an example electronic data sheet (EDS) used for configuring a sensor node, in accordance with an example embodiment. Referring to FIG. 3, the EDS 302 may include configuration data for a given sensor within the sensor block 106, which may be used (e.g., by the CPU 120) to detect and configure the sensor. The configuration data may include sensor peripheral configuration data 304, offset data 306, configuration register data 310, capture register data 312, and loadable module data 314. The sensor peripheral configuration data 304 may indicate the clock rate that may be used (e.g., by a sensor driver) in connection the sensor. The offset data 306 may provide the offsets into the sensor mote memory (e.g., 122) or the NVM (e.g., 102), which stores detection registers, configuration registers, data read/capture registers, and any other registers that may be needed for sensor configuration or sensor data reading/processing.

The detection register data 308 may include at least one register address and an expected register value. The detection register data 308 may be used to detect the sensor device by reading the register values and cross-checking the values against known register values for certain types of sensor devices. The configuration register data 310 may include at least one register address and a value to write in the indicated register in order to configure the sensor device. The capture register data 312 may include at least one register address for a register used to store data captured by the sensor device. The loadable module data 314 may include data indicating an address (e.g., in the NVM 102) storing a loadable module for the sensor device, as well as the size of the loadable module.

Figure 4:
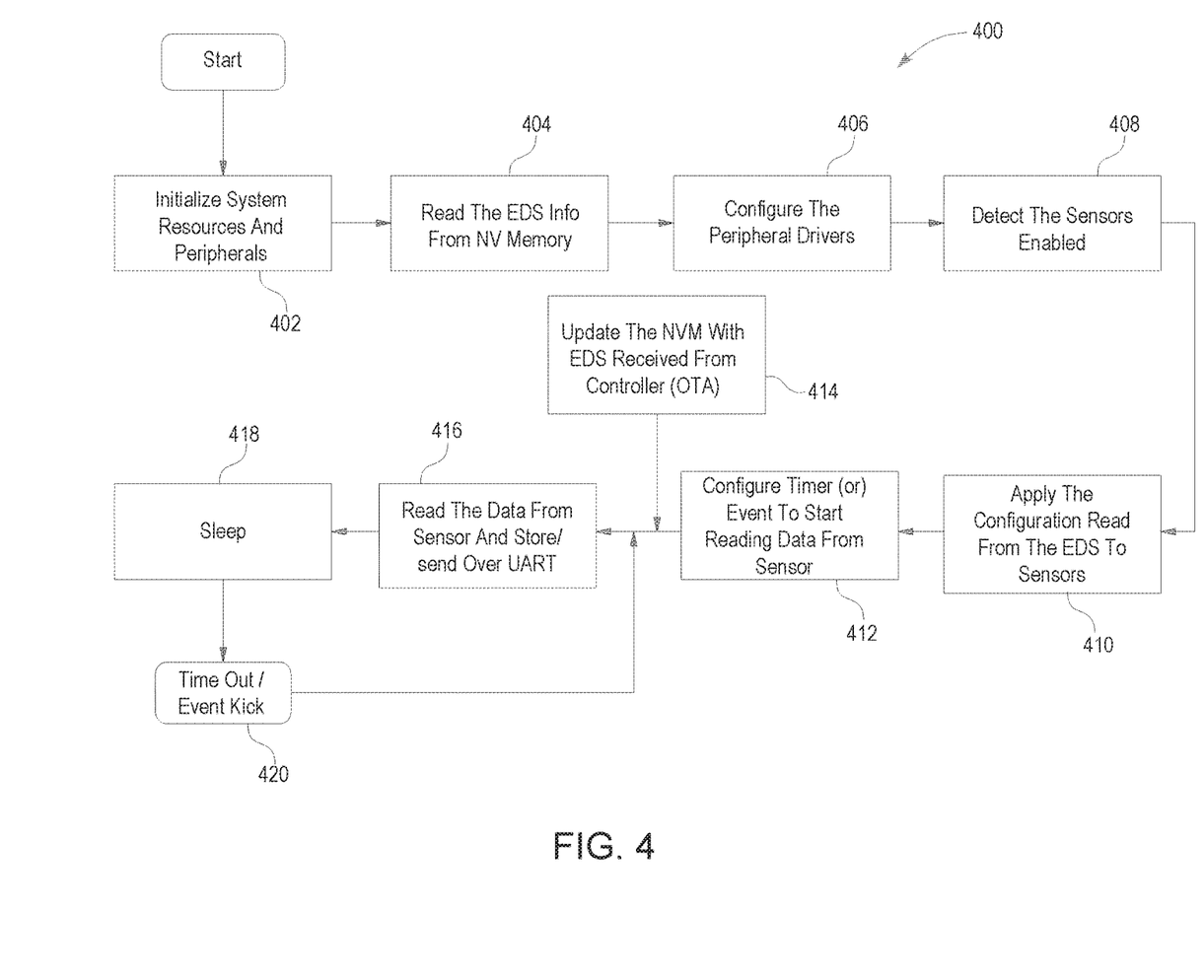
FIG. 4 illustrates a flow diagram of a method for configuring a sensor node using an EDS, in accordance with an example embodiment.

FIG. 4 illustrates a flow diagram of a method for configuring a sensor node using an EDS, in accordance with an example embodiment. Referring to FIG. 4, the example method 400 may start at 402 when resources of the sensor mote system 100 of FIG. 1 can be initialized. For example, system clocks and the connection interface with the NVM 102 can be initialized. In an example, the transceiver 124 can include a universal asynchronous receiver/transmitter (UART). Referring back to FIG. 4, debug print blocks may also be initialized at 402, and may be used to print out debug messages and sensor data output using the UART.

At 404, the EDS information from the NVM 102 of FIG. 1 may be read and stored in local memory 122. For example, the CPU 120 may read the sensor control page 110 and one or more of the EDSs, such as EDS 1 112 through EDS N 114. In the example of FIG. 4, at 406, the CPU 120 may configure one or more peripheral drivers, such as drivers for accessing the sensor block 106. In FIG. 4, at 408, the enabled sensors can be detected. For example, the CPU 120 of FIG. 1 may detect which sensors are enabled by reading the sensor control field 202 of FIG. 2 within the sensor control page 110 of FIG. 1. After determining which sensors are enabled, the CPU 120 of FIG. 1 may determine a memory address storing the EDS for the enabled sensor(s) using the configuration address field 204.

In FIG. 4, at 410, the configuration settings from the EDS associated with the enabled sensor may be applied to the sensor in order to configure it for operation. For example, during sensor configuration, a set of configuration registers may be written with pre-defined values. The configuration registers and the pre-defined values may be specified by the configuration register data (e.g., register data 310 of FIG. 3) within the EDS (e.g., EDS 302 of FIG. 3).

In FIG. 4, At 412, once the sensor is detected and configured, a timer even can be initiated to start reading data from the sensor. At 416, the CPU 120 may read the data received from the sensor from the capture registers (e.g., as identified by the capture register data 312 in the EDS). The read data may be stored or sent out for further processing as sensor data output 150. AT 418, the sensor mote system 100 may go into low-power (e.g., sleep) mode until a time out event has expired or a new event has been initiated (at 420).

In an example, information stored in the NVM 102 (e.g., the sensor control page 110, one or more of the EDSs, such as EDS 1 112 through EDS N 114, or the LMs, such as LM 1 116 through LM N 118) may be updated via the configuration update 140. For example, a user may communicate the update 140 to modify the sensor control page upon adding (enabling) or removing (disabling) a sensor.

Figure 5:
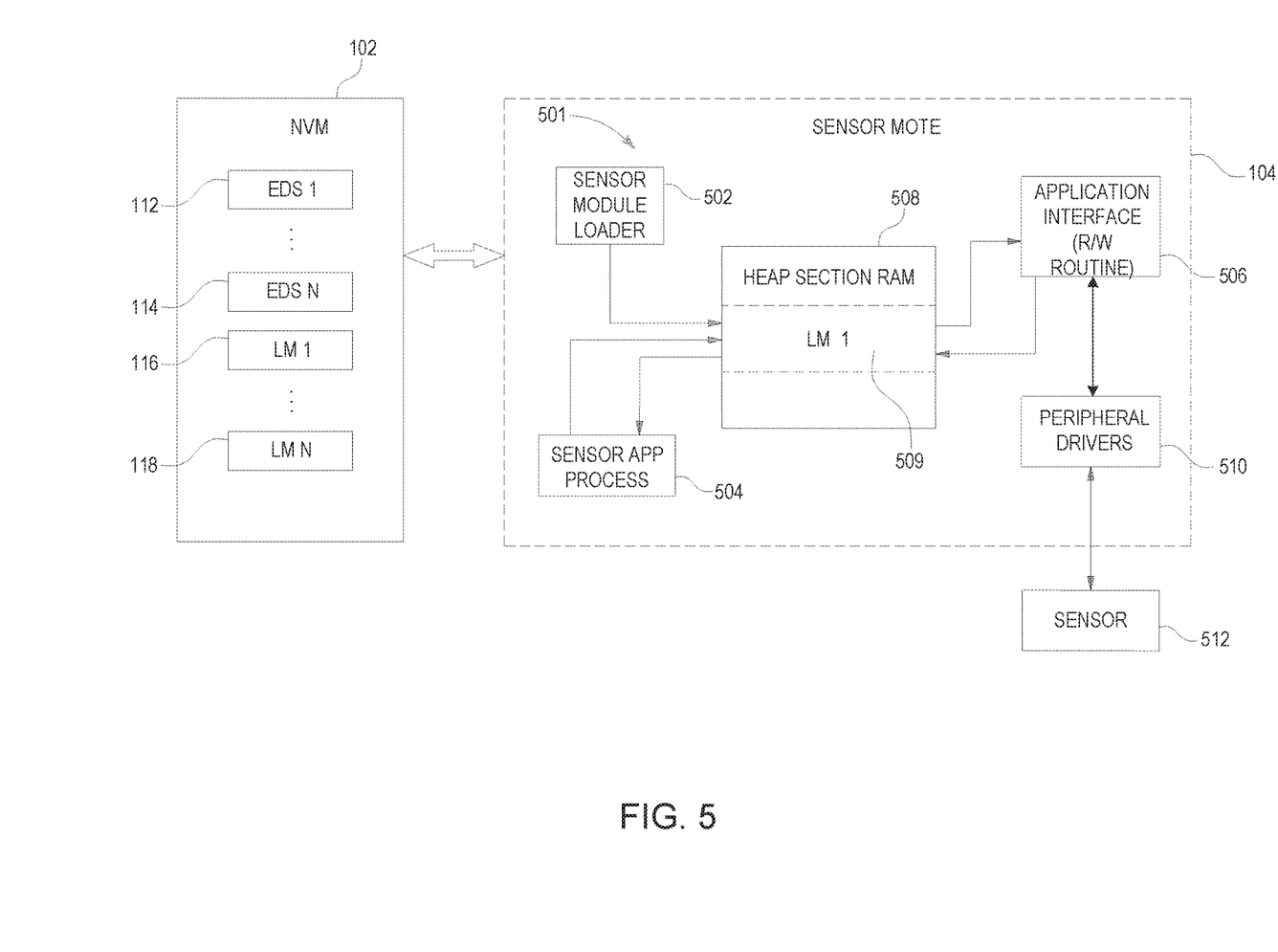
FIG. 5 is a block diagram illustrating a loadable module execution in a sensor mote system, in accordance with an example embodiment.

FIG. 5 is a block diagram illustrating a loadable module execution in a sensor mote system, in accordance with an example embodiment. Referring to FIG. 5, the sensor mote system includes NVM 102 coupled to sensor mote 104 (similar to the sensor mote system 100 of FIG. 1) and a sensor 512. In an example, the sensor mote 104 can use a sensor application 501 to configure the sensor 512 (e.g., using EDS) or collect/process sensor data using a loadable module (LM). The sensor application 501 can include a sensor module loader 502. The sensor module loader 502 may comprise suitable code and can be configured to reserve a memory portion 509 within the heap memory 508 (which can be part of the on-chip memory 122) for a loadable module (e.g., LM 116 associated with the sensor 512). In an example, the sensor module loader 502 may fetch both an EDS (e.g., EDS 112) and the LM 116 associated with the sensor 512, and store the EDS and the LM in the heap RAM 508.

The sensor application 501 may further include a sensor application process 504, which may comprise suitable code and may be used to detect and configure sensor 512 using the EDS 112 stored in the heap RAM 508. After the sensor 512 is detected and configured, the sensor application process 504 can execute the LM 116 to read sensor data from sensor 512.

More specifically, the sensor application process 504 can read the function offsets from the loaded LM, and can compute the absolute addresses of the target position independent code (PIC) functions (e.g., a sensor data read function). The PIC functions can then be executed to, e.g., read sensor data or process sensor data. The arguments passed to the LM (by the sensor application process 504) can include read/write routines of the application interface module 506. During LM execution, the LM 116 can call the application interface module 506 read/write routine using a function absolute address received as argument from the sensor application process 504. The read/write routine of the application interface module 506 can read the sensor data from sensor 512 via the peripheral drivers 510, and can pass the data to the LM 116. The sensor data read function of the LM may perform data processing to, e.g., convert the data to real sensor values (e.g., information stream or other presentable data), and may pass the processed data to the sensor application process 504 for further communication as sensor data output 150. In this regard, by using the sensor application 501 for sensor-related functions in connection with an EDS and LM, sensor driver dependency is reduced and memory management can be performed more efficiently by storing and updating the configuration information within the remote NVM 102.

Figure 6:
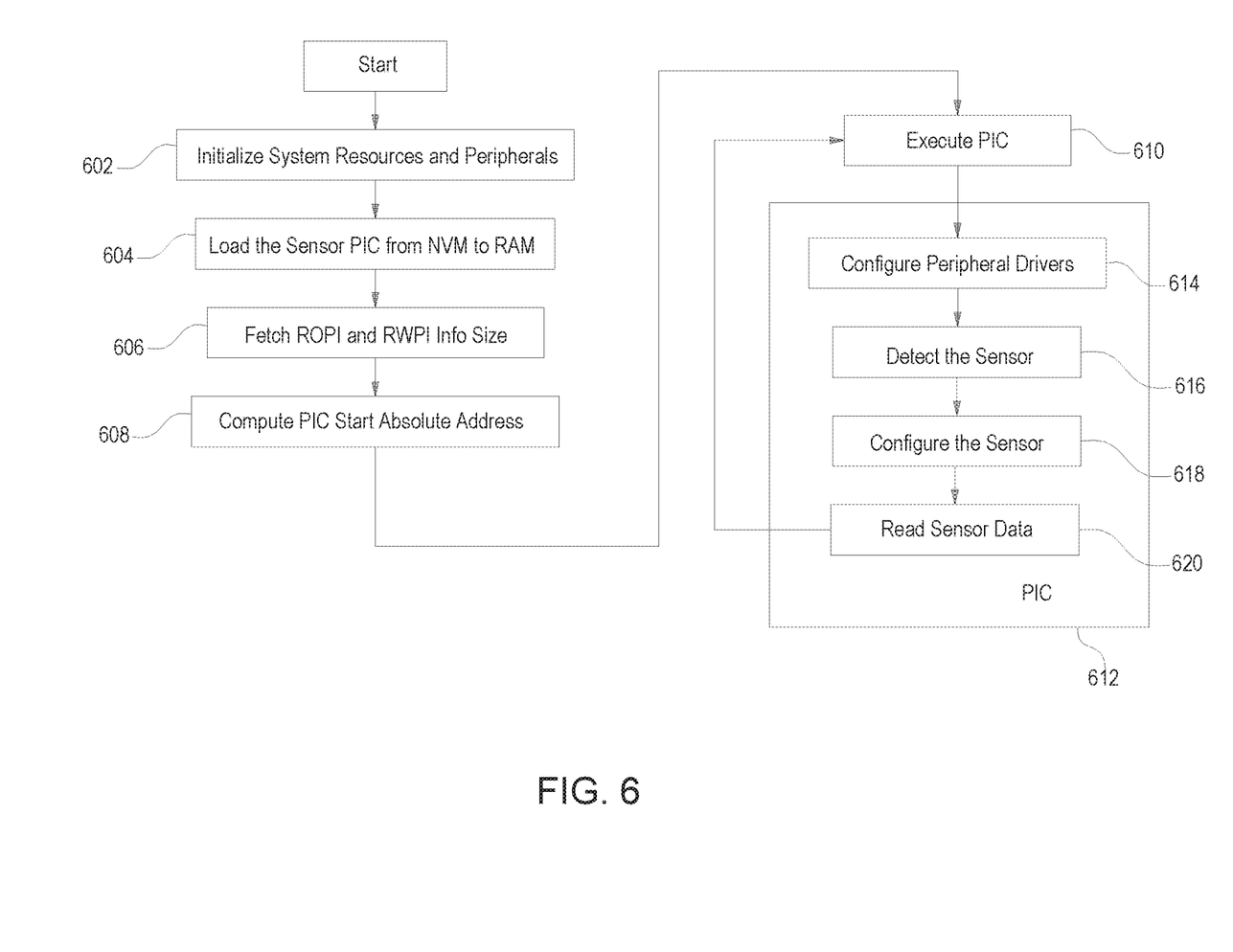
FIG. 6 illustrates a flow diagram of loadable module execution, in accordance with an example embodiment.

FIG. 6 illustrates a flow diagram of loadable module execution, in accordance with an example embodiment. Referring to FIG. 6, the example loadable module execution may start at 602, when system resources and peripherals may be initialized. For example, system clocks and the connection interface with the NVM 102 can be initialized. Additionally, the peripheral drivers 510 for communication with the sensor 512 may also be initialized. At 604, the sensor position independent code (PIC) (i.e., the LM 116 corresponding to sensor 512) may be loaded from NVM 102 into the heap RAM 508. At 606, the sensor module loader 502 may also fetch read-only position independence (ROPI) and read-write position independence (RWPI) information size data from the NVM 102. At 608, the PIC start absolute address may be computed. More specifically, the sensor application process 504 can read the function offsets from the loaded LM, and can compute the absolute addresses of the target position independent code (PIC) functions (e.g., a sensor data read function). At 610, the PIC of the LM can be executed.

In addition to the LM 116, the EDS 112 (associated with sensor 512) may also be fetched from the NVM 102 at 604. In this regard, the PIC 612 can be executed so as to perform detection, configuration as well as data collection functionalities. For example, and as illustrated in FIG. 6, PIC execution may include configuring the peripheral drivers at 614 (in instances when such function is not performed at 602). At 616, the sensor 512 may be detected (in instances when such function is not performed at 408). At 618, the sensor 512 may be configured (in instances when such function is not performed at 410). At 620, sensor data may be read (e.g., using the LM 116).

Figure 7:
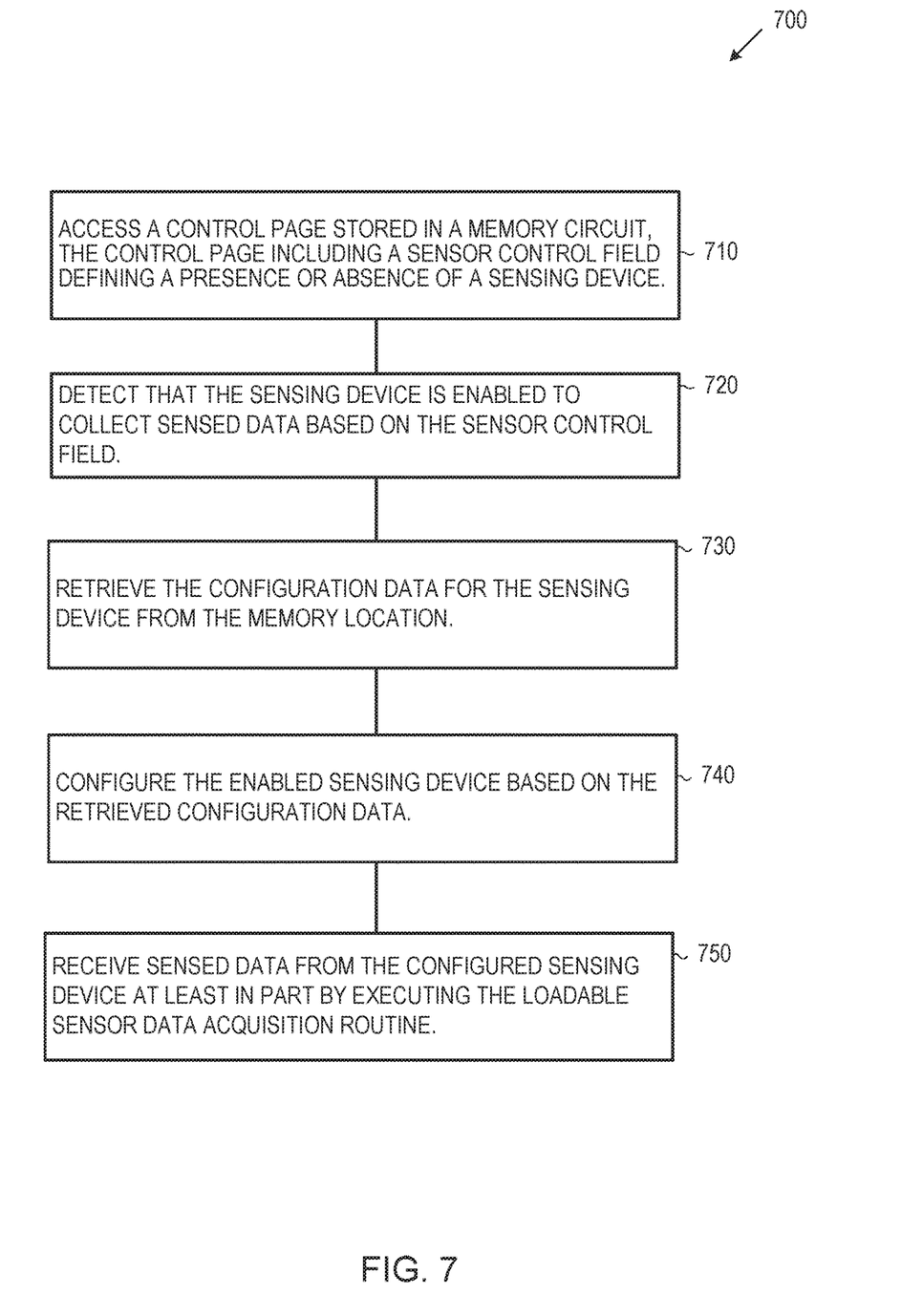
FIG. 7 illustrates a flow diagram of an example method for configuring an embedded sensor system comprising a sensing device, in accordance with an embodiment.

FIG. 7 illustrates a flow diagram of an example method for configuring an embedded sensor system comprising a sensing device, in accordance with an embodiment. Referring to FIG. 7, the example method 700 may start at 710, when a control page stored in a memory circuit may be accessed. For example, the CPU 120 (e.g., the sensor application 501 run by the CPU 120) may access the sensor control page 110 stored in the NVM 102. The control page 110 may include a sensor control field (e.g., 202) defining a presence or absence of a sensing device (e.g., 512), and an address field (e.g., 204) defining a memory location storing configuration data (e.g., an EDS or a LM) for the sensing device. At 720, the CPU 120 may detect that the sensing device is enabled to collect sensed data based on the sensor control field. For example, one of the bits 210, . . . , 214 corresponding to sensor 512 may be enabled (e.g., with a value of 1). At 730, the configuration data for the sensing device may be retrieved from the memory location. For example, the sensor module loader 502 may retrieve a loadable sensor device data acquisition and processing routine (i.e., a loadable module) for collecting the sensed data. Additionally, an EDS associated with the sensor 512 may also be retrieved for detecting and configuring the sensor 512. At 740, the enabled sensing device can be configured based on the retrieved configuration data (e.g., based on the retrieved EDS). At 750, the sensed data may be received from the configured sensing device at least in part by executing the loadable sensor data acquisition and processing routine (i.e., by executing the LM, as described in reference to FIG. 5 and FIG. 6).

Various Notes & Examples

Example 1 is an embedded sensor system, comprising: a memory circuit storing configuration data and loadable sensor device data acquisition and processing routines corresponding to respective ones of a plurality of sensing devices; and a processor circuit communicatively coupled to the memory circuit and coupleable to one or more sensing devices amongst the plurality of sensing devices, wherein the processor circuit is configured to: detect that the one or more sensing devices amongst the plurality of sensing devices is coupled to the processor circuit and is enabled to collect sensed data, using information about a sensor control field stored in the memory circuit, the sensor control field defining at least a presence or absence of a sensing device; retrieve configuration data from the memory circuit, the retrieved configuration data corresponding to the enabled one or more sensing devices amongst the plurality of sensing devices; configure the enabled one or more sensing devices based on the retrieved configuration data; and receive sensed data from the configured one or more sensing devices at least in part by executing a corresponding one of the loadable sensor data acquisition and processing routines.

In Example 2, the subject matter of Example 1 optionally includes wherein the sensor control field further defines a memory location of the configuration data corresponding to the enabled one or more sensing devices.

In Example 3, the subject matter of any one or more of Examples 1-2 optionally include the plurality of sensing devices.

In Example 4, the subject matter of Example 3 optionally includes wherein the plurality of sensing devices comprises one or more of: an Inter Integrated Circuit (I2C) sensor; an Analog-to-Digital-Conversion (ADC) sensor; and a Serial Peripheral Interface (SPI) sensor.

In Example 5, the subject matter of any one or more of Examples 1-4 optionally include wherein the memory circuit comprises an off-chip non-volatile memory (NVM).

In Example 6, the subject matter of Example 5 optionally includes an on-chip processor memory storing a loader application for loading and executing data. stored in the WM.

In Example 7, the subject matter of Example 6 optionally includes wherein the processor circuit is further configured to: execute the loader application from the on-chip processor memory to load the corresponding one of the sensor device data acquisition and processing routines from the NVM into a heap memory portion of the on-chip processor memory.

In Example 8, the subject matter of Example 7 optionally includes wherein the processor circuit is further configured to: parse position independent code (PIC) stored in the heap memory to determine an absolute address of a target function of the corresponding acquisition routine; and execute the target function to process the sensed data from the configured one or more sensing devices.

In Example 9, the subject matter of any one or more of Examples 1-8 optionally include wherein the sensor control field, the configuration data and the loadable sensor device data acquisition and processing routines are stored sequentially in the memory circuit.

In Example 10, the subject matter of any one or more of Examples 1-9 optionally include wherein the configuration data is an electronic data sheet (EDS) comprising at least one of: sensor clock rate driver information; detection register data to configure detection of a sensor; configuration register data to configure the sensor; and capture register data specifying register location to store data collected by the sensor.

In Example 11, the subject matter of Example 10 optionally includes wherein the EDS further comprises: loadable module data indicating at least a memory location in the memory circuit storing the corresponding one of the loadable sensor data acquisition and processing routines.

Example 12 is a method for configuring an embedded sensor system comprising a sensing device, the method comprising: accessing a control page stored in a memory circuit, the control page comprising a sensor control field defining a presence or absence of the sensing device, and an address field defining a memory location storing configuration data for the sensing device; detecting that the sensing device is enabled to collect sensed data based on the sensor control field; retrieving the configuration data for the sensing device from the memory location, the retrieved configuration data comprising a loadable sensor device data acquisition and processing routine for collecting the sensed data; configuring the enabled sensing device based on the retrieved configuration data; and receiving sensed data from the configured sensing device at least in part by executing the loadable sensor data acquisition and processing routine.

In Example 13, the subject matter of Example 12 optionally includes wherein the memory circuit is an off-chip non-volatile memory (NVM) and the method further comprises: loading the sensor device data acquisition and processing routine from the NVM into a heap memory portion of an on-chip processor memory.

In Example 14, the subject matter of Example 13 optionally includes parsing position independent code (PIC) of the sensor device data acquisition and processing routine to determine an absolute address of a sensor data read function.

In Example 15, the subject matter of Example 14 optionally includes executing the determined function to read the sensed data from the configured sensing device; and converting the read data into one or more real sensor values for presentation to a user.

Example 16 is at least one computer-readable storage medium comprising instructions that, when executed on a central processing unit (CPU) of an embedded sensor system, cause the CPU to: access a control page stored in a memory circuit, the control page comprising a sensor control field defining a presence or absence of a sensing device, and an address field defining a memory location storing configuration data for the sensing device; detect that the sensing device is enabled to collect sensed data based on the sensor control field; retrieve the configuration data for the sensing device from the memory location, the retrieved configuration data comprising a loadable sensor device data acquisition and processing routine for collecting the sensed data; configure the enabled sensing device based on the retrieved configuration data; and receive sensed data from the configured sensing device at least in part by executing the loadable sensor data acquisition and processing routine.

In Example 17, the subject matter of Example 16 optionally includes wherein when executed, the instructions further cause the CPU to: load the sensor device data acquisition and processing routine from the memory circuit into a heap memory portion of an on-chip processor memory that is separate from the memory circuit; and determine an absolute address of a sensor data read function using the sensor device data acquisition and processing routine.

In Example 18, the subject matter of any one or more of Examples 16-17 optionally include wherein when executed, the instructions further cause the CPU to: detect the sensing device based on detection register data within the configuration data.

In Example 19, the subject matter of Example 18 optionally includes wherein when executed, the instructions further cause the CPU to: writing configuration values into a set of configuration registers to configure the sensing device to collect the sensed data into one or more capture registers.

In Example 20, the subject matter of Example 19 optionally includes wherein the configuration values, the configuration registers and the one or more capture registers are specified by the configuration data.

Each of the non-limiting examples described herein can stand on its own, or can be combined in various permutations or combinations with one or more of the other examples.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. An embedded sensor system for use with a plurality of dynamically reconfigurable sensing devices, comprising:
 a memory circuit storing configuration data and loadable sensor device data acquisition and processing routines corresponding to respective ones of the plurality of sensing devices; and
 a processor circuit communicatively coupled to the memory circuit and configured to:
  detect that one or more sensing devices amongst the plurality of sensing devices is coupled to the processor circuit and is enabled to collect sensed data, using information about a sensor control field stored in the memory circuit, the sensor control field defining at least a presence or absence of respective ones of the plurality of sensing devices;
  retrieve configuration data from the memory circuit using a configuration address field stored in the memory circuit and corresponding to the enabled one or more sensing devices, the retrieved configuration data corresponding to the enabled one or more sensing devices amongst the plurality of sensing devices and including a register value and a register associated with the detected one or more sensing devices;
  configure the enabled one or more sensing devices based on the retrieved configuration data, the configuring including writing the register value into the register associated with the one or more sensing devices; and
  receive sensed data from the configured one or more sensing devices at least in part by executing a corresponding one of the loadable sensor data acquisition and processing routines.

2. The sensor system according to claim 1, wherein the sensor control field further defines a memory location of the configuration data corresponding to the enabled one or more sensing devices.

3. The sensor system according to claim 1, further comprising the plurality of sensing devices.

4. The sensor system according to claim 1, wherein the plurality of sensing devices comprises one or more of:
 an Inter Integrated Circuit (I2C) sensor;
 an Analog-to-Digital-Conversion (ADC) sensor; and
 a Serial Peripheral interface (SPI) sensor.

5. The sensor system according to claim 1, wherein the memory circuit comprises non-volatile memory (NVM).

6. The sensor system according to claim 1, further comprising an on-chip processor memory storing a loader application for loading and executing data stored in the memory circuit.

7. The sensor system according to claim 6, wherein the processor circuit is further configured to:
 execute the loader application from the on-chip processor memory to load the corresponding one of the sensor device data acquisition and processing routines from the memory circuit into a portion of the on-chip processor memory.

8. The sensor system according to claim 7, wherein the processor circuit is further configured to:
 parse position independent code (PIC) stored in the heap memory to determine an absolute address of a target function of the corresponding acquisition routine; and
 execute the target function to process the sensed data from the configured one or more sensing devices.

9. The sensor system according to claim 1, wherein the sensor control field, the configuration data and the loadable sensor device data acquisition and processing routines are stored sequentially in the memory circuit.

10. The sensor system according to claim 1, wherein the configuration data is an electronic data sheet (EDS) comprising at least one of:
 detection register data to configure detection of a sensor;
 configuration register data to configure the sensor, the configuration register data including the register value and the register associated with the detected one or more sensing devices; and
 capture register data specifying register location to store data collected by the sensor.

11. The sensor system according to claim 1, wherein the configuration data includes
 loadable module data indicating at least a memory location in the memory circuit storing the corresponding one of the loadable sensor data acquisition and processing routines.

12. A method for configuring an embedded sensor system for use with a plurality of dynamically reconfigurable sensing devices, the method comprising:
 accessing a control page stored in a memory circuit, the control page comprising a sensor control field defining a presence or absence of a sensing device of the plurality of sensing devices, and an address field defining a memory location storing configuration data for the sensing device;
 detecting that the sensing device is enabled to collect sensed data based on the sensor control field;
 retrieving the configuration data for the sensing device from the memory location using the address field, the retrieved configuration data comprising a register value associated with the sensing device and a loadable sensor device data acquisition and processing routine for collecting the sensed data;
 configuring the enabled sensing device based on the retrieved configuration data, wherein the configuring includes writing the register value into a register associated with the sensing device; and
 receiving sensed data from the configured sensing device at least in part by executing the loadable sensor data acquisition and processing routine.

13. The method according to claim 12, wherein the memory circuit is a non-volatile memory (NVM) and the method further comprises:
 loading the sensor device data acquisition and processing routine from the NVM into a heap memory portion of an on-chip processor memory.

14. The method according to claim 13, further comprising:
 parsing position independent code (PIC) of the sensor device data acquisition and processing routine to determine an absolute address of a sensor data read function.

15. The method according to claim 14, further comprising:
 executing the determined function to read the sensed data from the configured sensing device; and
 converting the read data into one or more real sensor values for presentation to a user.

16. At least one computer-readable storage medium comprising instructions that, when executed on a central processing unit (CPU) of an embedded sensor system for use with a plurality of dynamically reconfigurable sensing devices, cause the CPU to:

access a control page stored in a memory circuit, the control page comprising a sensor control field defining a presence or absence of a sensing device of the plurality of sensing devices, and an address field defining a memory location storing configuration data for the sensing device;

detect that the sensing device is enabled to collect sensed data based on the sensor control field;

retrieve the configuration data for the sensing device from the memory location using the address field, the retrieved configuration data comprising a register value associated with the sensing device and a loadable sensor device data acquisition and processing routine for collecting the sensed data;

configure the enabled sensing device based on the retrieved configuration data, wherein the configuring includes writing the register value into a register associated with the sensing device; and receive sensed data from the configured sensing device at least in part by executing the loadable sensor data acquisition and processing routine.

17. The at least one computer-readable storage medium according to claim 16, wherein when executed, the instructions further cause the CPU to:

load the sensor device data acquisition and processing routine from the memory circuit into a heap memory portion of an on-chip processor memory that is separate from the memory circuit; and determine an absolute address of a sensor data read function using the sensor device data acquisition and processing routine.

18. The at least one computer-readable storage medium according to claim 16, wherein when executed, the instructions further cause the CPU to:

detect the sensing device based on detection register data within the configuration data.

19. The at least one computer-readable storage medium according to claim 18, wherein when executed, the instructions further cause the CPU to:

writing configuration values into a set of configuration registers to configure the sensing device to collect the sensed data into one or more capture registers.

20. The at least one computer-readable storage medium according to claim 19, wherein the configuration values, the configuration registers and the one or more capture registers are specified by the configuration data.

21. The sensor system according to claim 1, wherein the configuration data is an electronic data sheet (EDS) comprising at least one of:

sensor peripheral configuration data including sensor clock rate driver information for the enabled one or more sensing devices; and offset data providing an offset into the memory, the memory storing one or more registers associated with configuring the one or more sensing devices or processing the sensed data from the one or more sensing devices.

22. The at least one computer-readable storage medium according to claim 17, wherein when executed to configure the enabled sensing device, the instructions further cause the CPU to:

set a clock rate of the enabled one or more sensing devices using sensor clock rate driver information within the retrieved configuration data.

23. An embedded sensor system for use with a plurality of dynamically reconfigurable sensing devices, comprising:

a non-volatile memory (NVM) storing configuration data and loadable sensor device data acquisition and processing routines corresponding to respective ones of the plurality of sensing devices; and a processor circuit communicatively coupled to the memory circuit and to a second memory, the processor circuit configured to:

detect that one or more sensing devices amongst the plurality of sensing devices is coupled to the processor circuit and is enabled to collect sensed data, based on a sensor control field stored in the NVM and defining at least a presence or absence of respective ones of the plurality of sensing devices;

retrieve configuration data corresponding to the enabled one or more sensing devices from the NVM using a configuration address field corresponding to the enabled one or more sensing devices;

configure the enabled one or more sensing devices based on the retrieved configuration data, the configuring including writing the register value into the register associated with the one or more sensing devices; and receive sensed data from the configured one or more sensing devices at least in part by loading a corresponding one of the sensor data acquisition and processing routine from the NVM into a portion of the second memory, and executing the loaded routine.

24. The sensor system according to claim 23, wherein the processor circuit is further configured to:

parse position independent code (PIC) stored in the portion of the second memory to determine an absolute address of a target function of the corresponding acquisition and processing routine; and execute the target function to process the sensed data from the configured one or more sensing devices.

25. The sensor system according to claim 23, wherein the sensor control field, the configuration data and the loadable sensor device data acquisition and processing routines are stored sequentially in the NVM.

26. The sensor system according to claim 23, wherein to configure the enabled one or more sensing devices, the processor circuit is further configured to:

set a clock rate of the enabled one or more sensing devices using sensor clock rate driver information within the retrieved configuration data.

* * * * *

UNITED STATES PATENT AND TRADEMARK OFFICE
CERTIFICATE OF CORRECTION

PATENT NO. : 10,157,058 B2
APPLICATION NO. : 15/273940
DATED : December 18, 2018
INVENTOR(S) : Malladi et al.

Page 1 of 1

It is certified that error appears in the above-identified patent and that said Letters Patent is hereby corrected as shown below:

In the Claims

In Column 11, Line 47, in Claim 4, delete "interface" and insert --Interface-- therefor In Column 11, Line 49, in Claim 5, after "comprises", insert --a--

In Column 12, Line 17, in Claim 11, after "includes", delete "¶"

Signed and Sealed this
Seventh Day of April, 2020

Andrei Iancu
*Director of the United States Patent and Trademark Office*